CENTRIFUGED LIQUID OUT

VAPOR IN

Oct. 14, 1969

I. F. EVKIN 3,472,304

FALLING FILM EVAPORATOR

Filed Feb. 1, 1967

United States Patent Office 3,472,304
Patented Oct. 14, 1969

3,472,304
FALLING FILM EVAPORATOR
Ivan Frolovich Evkin, Scherbakovskaya ulitsa 16/18,
kv. 245, Moscow, U.S.S.R.
Filed Feb. 1, 1967, Ser. No. 613,173
Int. Cl. B01d 1/22
U.S. Cl. 159—6         7 Claims

ABSTRACT OF THE DISCLOSURE

A heat exchanger in which a liquid distributing element in the form of a vertically axised, hollow, cylindrical, rotatable drum with corrugated walls is coaxially disposed within a vertical, cylindrical, hollow double-walled, internally heated body with an interior heat exchange surface such that liquid fed into the interior of the drum is centrifugally discharged through openings in its corrugated walls against the body exchange surface.

---

This invention relates to heat exchangers for physical and chemical processes, more particularly, to film evaporators. The present invention may be also used in the chemical pharmaceutical and food industries.

A known film evaporator (patent of the Federal Republic of Germany No. 1,029,642, Cl. 12a, 2, Apr. 30, 1958), is a vertical body with the liquid distributed over its walls by means of a rotor revolving inside the body on a vertical shaft. The rotor is provided with a liquid distributor made in the form of a centrifugal ring installed at a level with a hole in the body, through which the basic material is fed into the evaporator.

The liquid is distributed over the walls by means of radial blades fixed rigidly fixed on the rotor shaft and arranged so that they are 1 to 2 mm. short of the body walls.

The basic disadvantages of the known evaporator are limited heat exchange area; complicated process of manfacture and assembly because of the small clearance between the body and rotor, and because of the necessity for coaxial arrangement of the rotor in the apparatus; moreover the evaporator is troublesome in operation, since even a minor disturbance of the production process, i.e., a change in the vapor characteristics in one of the jackets results in temperature deformation of the rotor, impairs its balancing, etc.; the evaporator reaches its peak efficiency only at large liquid loads, that is when 20 to 25 percent of the basic material is discharged from the apparatus.

An object of this invention resides in providing a simple, inexpensive and easily operated heat exchanger.

Another object of this invention resides in providing a heat exchanger with high coefficients of heat exchange, and mass transfer.

Another object of this invention resides in providing a heat exchanger wherein the intensity of heat exchange depends to a minimum extent on the minimum liquid load.

Still another object of this invention resides in providing a heat exchanger with a heat exchange area exceeding in size that of the known heat exchangers of a similar type.

In conformity with the above and other objects the heat exchanger in accordance with the invention has a distributing element consisting of at least one hollow drum with longitudinally corrugated walls allowing the liquid to be thrown from the drum over the entire internal surface of the body.

Other objects and advantages of the present invention will become apparent from the description of an embodiment thereof, with reference to the appended drawings, in which.

Figure 1:
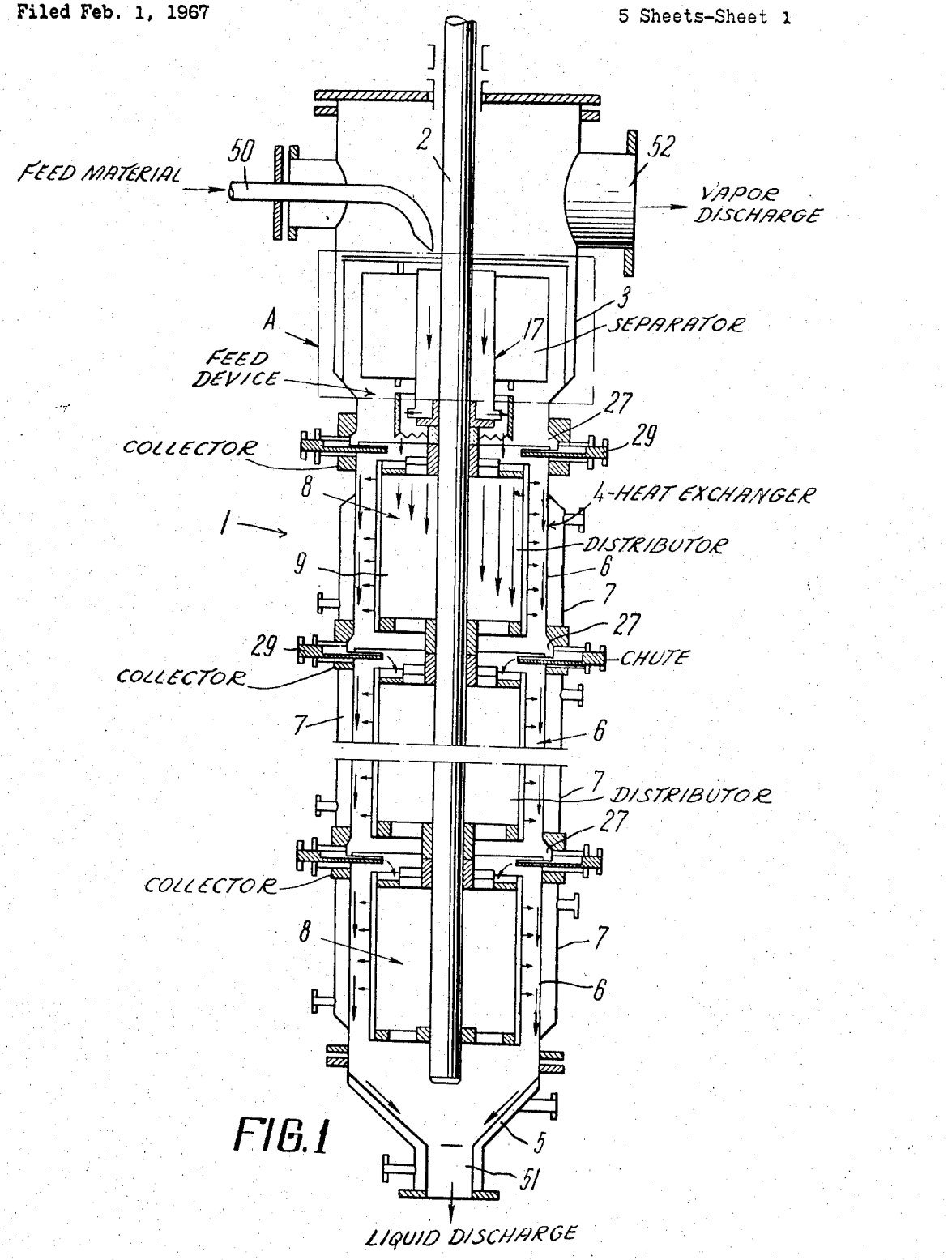
FIG. 1 is a longitudinal section of a film evaporator according to the invention.

The film evaporator illustrated in FIG. 1 is an externally heated vertical body 1 in which a motor-driven rotor shaft 2 rotates, said shaft being arranged along the vertical axis of the body 1 and driven by an electric motor (not shown in figure).

The evaporator body 1 consists of an upper wider part 3, a middle heat exchange part 4, and a lower tapered part 5. The middle heat exchange part 4 is divided into four sections 6 having heating jackets 7 accommodating distributing elements 8 installed on the rotor shaft 2 one above another and designed for uniform distribution of the liquid over the entire surface of the heat exchange part 4 of the body 1. The number of sections in the evaporator may be reduced or increased to suit the production requirements.

The heat exchange part 4 of the body 1 and drum 9 of the evaporator of the invention may be either cylindrical or tapered in shape.

Figure 2:
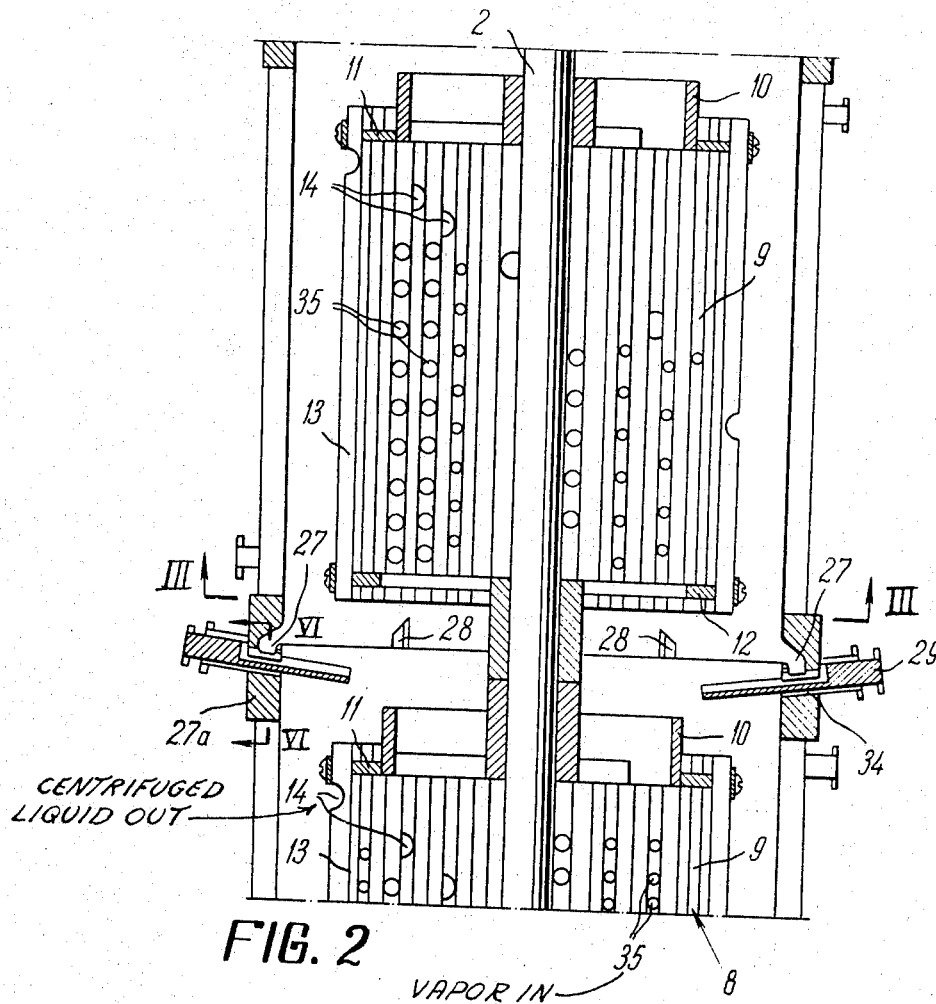
FIG. 2 is a longitudinal section on enlarged scale of a portion of the film evaporator.
Figure 3:
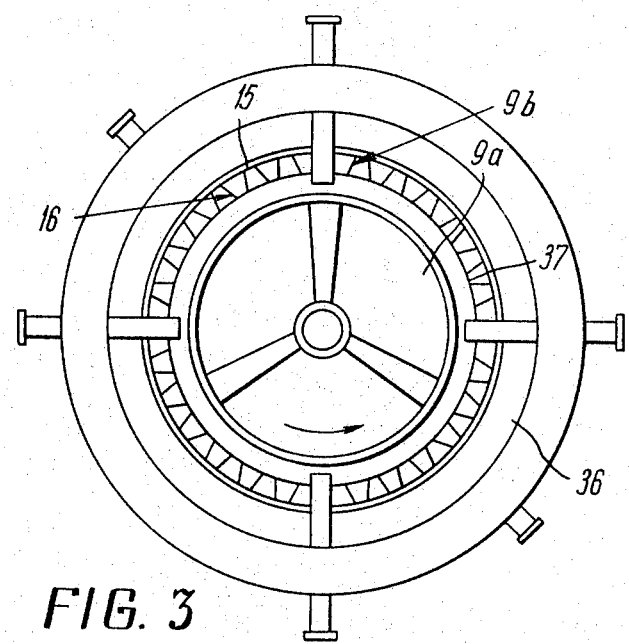
FIG. 3 is a section taken along line III—III in FIG. 2.

Shown in FIG. 2 is the distributing element 8 having the form of a hollow drum 9 provided with a cylinder 10 secured on the rotor shaft 2 for preventing the liquid from being thrown into a space 9a (FIG. 3) of the drum 9; and rings 11 and 12 (FIG. 2) located above and beneath the drum for fastening the drum 9 to the rotor shaft 2. The upper ring 11 serves also for distributing the liquid over the internal surface 9b (FIG. 3) of the drum 9.

The walls 13 of the drum 9 are longitudinally corrugated for dividing the liquid which is fed onto the internal surface 9b of the drum 9 into a number of streams freely flowing down the walls 13 of the drum 9.

The walls 13 of the drum 9 are made so as to allow the liquid to be discharged from the drum 9 onto the surface of the heat exchange part 4 of the body 1.

The liquid is discharged from the drum 9 through holes 14 arranged along descending helical lines on projections 15 (FIG. 3) of the corrugations 16 of the drum 9.

Installed in the upper wider part of the evaporator, as shown in FIG. 1, is a device 17 for uniform supply of the liquid around the circumference in the drum 9.

Figure 4:
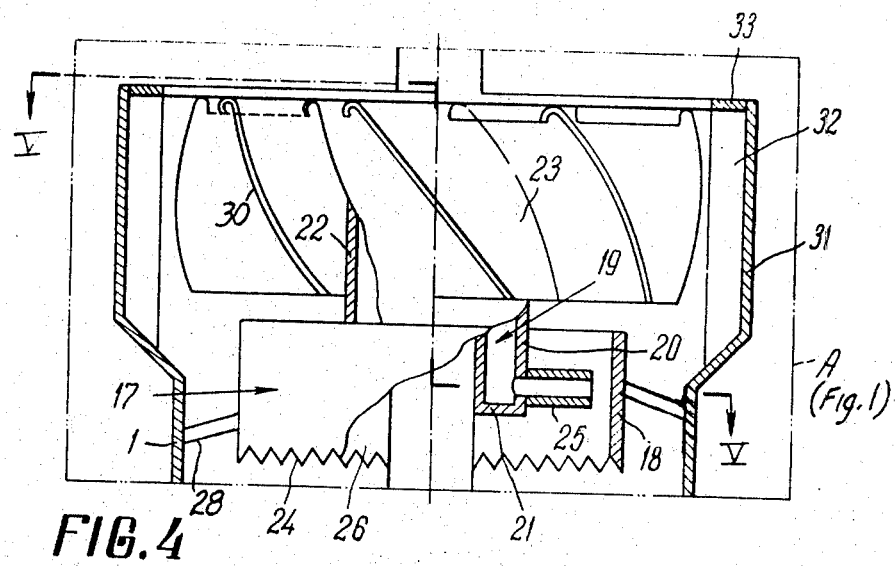
FIG. 4 is a longitudinal section of an assembly designated by letter A of FIG. 1.

The device 17 as illustrated in detail in FIG. 4 consists of a cylinder 18 rigidly secured in the evaporator body 1 by studs 28 and a feeder 19 having the form of a sleeve 20 mounted on the rotor shaft 2. The bottom 21 of the sleeve 20 is located in the cylinder 18 while its side surface 22 is brought in line with a separator 23.

The lower base 24 of the cylinder 18 is provided with teeth for a more uniform supply of the liquid around the circumference of the drum 9.

The lower part of the feeder 19 has radial tubes 25 through which the liquid flows from the feeder onto the internal surface 26 of the cylinder 18.

Installed in the upper part of each section 6 (FIGS. 1 and 2) is a circular collector 27 intended for collecting the liquid flowing down from the surface of the heat exchange part 4 of each overlying section 6 and delivering it onto the distributing element 8 of the underlying section 6.

The circular collector 27 is divided by radial partitions 28 into sectors (shown in FIG. 2) and the collector 27 has chutes 29 inclined towards the vertical axis of the evaporator. The partitions are required for ensuring equal distribution of the liquid from each sector into the chute 29.

To facilitate assembly of the evaporator, the chutes 29 are made removable.

Figure 5:
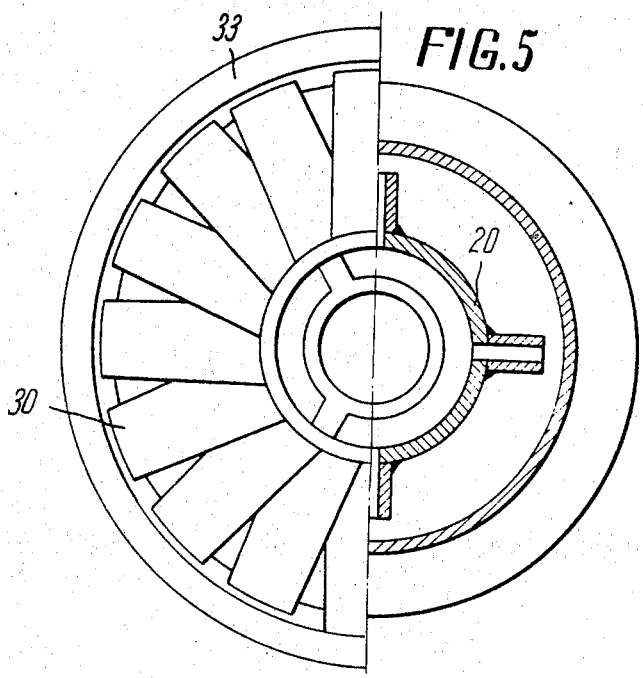
FIG. 5 is a section along line V—V in FIG. 4.

Surrounding the sleeve 20 (FIGS. 4 and 5) is the separator 23 installed which is made in the form of inclined blades 30 with beaded upper edges; said separator ensures separation of the liquid drops from the rising vapor flow and directs the liquid onto a surface 31 of the body 1 at its wider part 3. Uniform delivery of this separated liquid onto the distributing element 8 (FIG. 1) is ensured by the vertical ribs 32 (FIG. 4) installed in the wider part 3 and interconnected by a ring 33 (FIG. 5).

The combination of the feeder 19 with the separator 23 allows to reducing the evaporator height.

Figure 6:
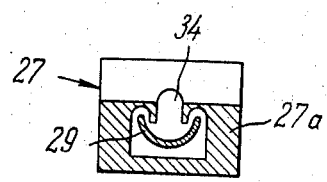
FIG. 6 is a section along line VI—VI in FIG. 2.

The circulator collector channel 27 (FIGS. 2 and 6) has ducts 34 arranged around the circumference in the body 27a of the collector 27 and serve to fasten the chutes 29 and for liquid overflow from collector 27 to chutes 29.

For more uniform distribution of vapor over the entire section of the evaporator, the drums 9 are provided with additional holes 35 (FIG. 2) for the passage of the vapor formed in the body 1, into the drums 9 from a circular space 36 (FIG. 3) between the drums 9 and the body 1. Those holes 35 (FIG. 2) are equispaced at the same pitch in the hollows 37 of the corrugations 16 (FIG. 3) over the whole height of the drum 9.

Figure 7:
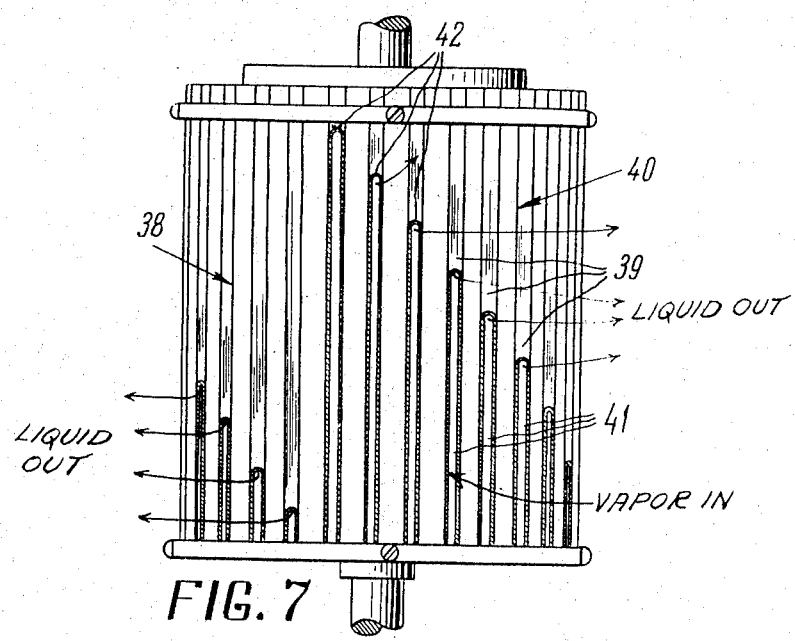
FIG. 7 is an elevation view of an embodiment of a hollow drum.

Illustrated in FIG. 7 is another embodiment of the hollow drum 38. Projections 39 of corrugations 40 of the drum 38 have longitudinal slots 41 whose upper edges constitute helical lines over the height of the drum 38.

The liquid is thrown from the internal surface of the drum onto the heat exchange surface of the body at lower edges 42 of projections of corrugations 40 whereas the vapor formed on the heat exchange surface of the evaporator passes into the drum via the slots 41.

Figure 8:
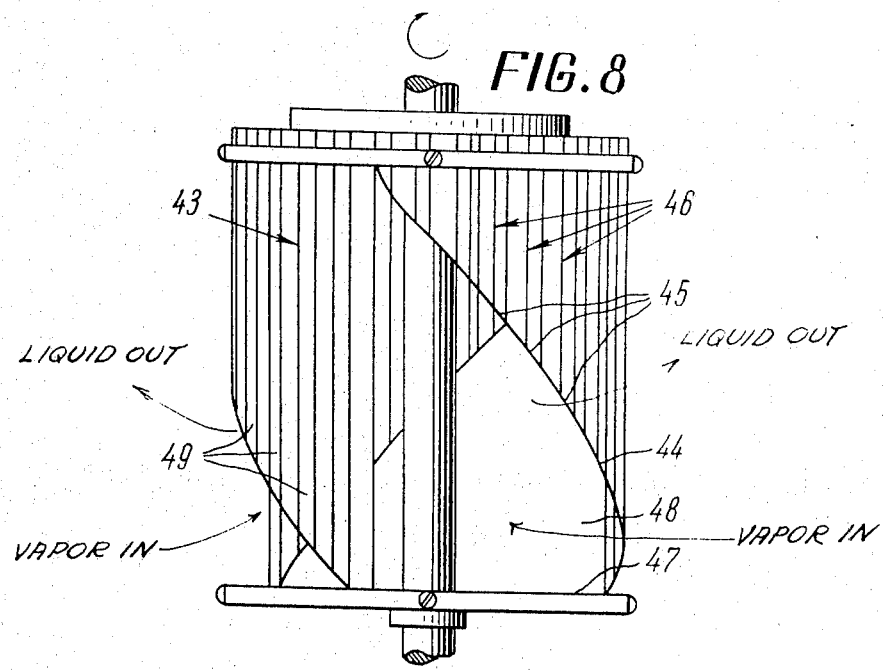
FIG. 8 is an elevation view of another embodiment of the hollow drum.

In FIG. 8 is shown another embodiment of the hollow drum 43. A part of a wall 44 of the drum 43 is cut out so that lower edges 45 of corrugations 46 form helical lines descending over the whole height of the drum.

As a result, a free passage into the space of the drum 43 is formed between the helical lines and the lower base 47 of the drum.

The liquid is thrown from the internal surface of the drum onto the heat exchange surface at the lower edges 45 of the projections 43 of the corrugations 46 whereas the vapor formed on the heat exchange surface of the body enters the drum through the free passage 48 cut out in the drum wall.

The film evaporator functions as follows: the basic material enters the feeder 19 through a pipe union 50 (FIG. 1). The revolving rotor throws the liquid into streams from the radial tubes 25 of the feeder 19 onto the internal surface 26 of the cylinder 18 from which it flows down uniformly in the form of a film onto the upper ring 11.

Then, being acted upon by centrifugal force, the liquid is thrown from the ring 11 onto the internal surface 9b of the hollow corrugated drum 9 and is distributed over the projections 15 of the corrugations 16 into individual vertical streams. These are thrown through the holes 14 in the projections 15 of the corrugations 16 onto the internal heat exchange surface 4 of the evaporator body 1 and form the downflowing film which is continuously turbulent by the liquid streams. A part of this liquid is evaporated on the heat exchange surface while the non-evaporated liquid flows down into the circular collector 27 wherefrom it flows along the chutes 29 onto the distributing element 8 of the underlying section 6 and the cycle is repeated over again. The evaporated solution is discharged through a pipe union 51 while the vapors move upward through the gap between the body 1 and the drums 9 as well as through said drums into which the vapors penetrate through the holes 35; then, having passed through the separator 23 the vapors are discharged through a pipe union 52. The drops of liquid separated by the blades 30 (FIG. 5) are thrown onto the wall of the wider part 3 (FIG. 1) from which they flow down into the circular collector 27 and return along the chutes 29 onto the distributing element 8 of the rotor.

The source material is treated in the evaporator in the course of a few seconds.

The evaporator of the present invention can be used for evaporation, distillation and concentration of thermally unstable, heavily foaming and high-viscosity substances.

Another advantage of the evaporator of the invention is that, after minor design changes it can be used as a reactor.

While a specific embodiment of the invention has been disclosed in the description, it will be understood that various modifications and changes within the spirit and the scope of the invention may occur to those skilled in the art.

These changes and modifications can be resorted to without departing from the function or scope of the invention as hereinafter defined by the appended claims.

I claim:

1. A heat exchanger comprising a vertical, cylindrical, hollow body having a vertical interior heat exchange surface and external heat exchanger means for heating said interior surface, a rotatable vertical shaft in said body, liquid distributing means fixed to and rotatable with said shaft for distributing liquid onto the heat exchange surface of said body, liquid feed means for feeding liquid to said distributing means, said distributing means comprising at least one distributing element including a hollow drum with longitudinally corrugated walls which have discharge openings to allow liquid to be thrown from the drum onto the heat exchange surface of said body, said liquid feed means being positioned relative to said drum of the uppermost distributing element to supply liquid against the interior surface thereof.

2. A heat exchanger as claimed in claim 1 wherein said liquid feed means comprises a coaxial, vertically axised cylinder with a serrated lower edge located above said drum of the uppermost distributing element and affixed to and supported by said body, and a feed sleeve secured to said shaft and including a lower portion having outwardly directed radial tubular nozzles facing said serrated cylinder.

3. A heat exchanger as claimed in claim 1 wherein said drum has a lower edge of helical outline to define said discharge openings in the drum.

4. A heat exchanger as claimed in claim 1 wherein said discharge openings in the walls of the drum are holes provided in the radially outermost portions of the corrugated walls.

5. A heat exchanger as claimed in claim 4 wherein said holes are cooperatively arranged along a helical line at the exterior surface of the corrugated drum.

6. A heat exchanger as claimed in claim 1 wherein a plurality of drums are provided in vertically superposed spaced relation along said shaft, the exchanger further comprising a circular collector secured to said body between adjacent drums, said collector including radial dividing partitions and inclined radial chutes directed inwardly in said body toward the vertical axis thereof, the innermost ends of the chutes overlying an annular liquid receiving channel contiguous with the upper inner surface of a corresponding drum for feeding the collected liquid to the interior surface of the drum.

7. A heat exchanger as claimed in claim 6 wherein said chutes are removably supported in said body.

References Cited

UNITED STATES PATENTS

| | | |
|---|---|---|
| 1,378,716 | 5/1921 | Nielson et al. |
| 1,846,288 | 2/1932 | Varnau et al. 261—89 |
| 1,859,770 | 5/1932 | Fleisher 239—215 |
| 2,210,826 | 8/1940 | Hickman 203—89 |
| 2,844,607 | 7/1958 | Gushin 260—400 |
| 2,933,527 | 4/1960 | Guyer et al. |

FOREIGN PATENTS

| | | |
|---|---|---|
| 6,816 | 5/1898 | Norway. |
| 30,827 | 3/1910 | Sweden. |

NORMAN YUDKOFF, Primary Examiner

J. SOFER, Assistant Examiner

U.S. Cl. X.R.

202—236